United States Patent [19]
Pignataro et al.

[11] 3,928,409

[45] Dec. 23, 1975

[54] CATALYTIC PROCESS FOR PREPARING UNSATURATED NITRILES FROM OLEFINS, AMMONIA AND OXYGEN

[75] Inventors: Francesco Pignataro, Gallarate (Varese); Franco Faletti, Milan; Arsenio Castellan, Bollate (Milan); Alessandro Bossi, Novara; Paolo Marinozzi; Nicola Giordano, both of Milan, all of Italy

[73] Assignee: Montedison S.p.A., Milan, Italy

[22] Filed: Oct. 22, 1974

[21] Appl. No.: 516,999

[30] Foreign Application Priority Data
Jan. 21, 1974  Italy ................................ 19613/74

[52] U.S. Cl. ............................................. 260/465.3
[51] Int. Cl.² ........................................ C07C 120/14
[58] Field of Search ................................. 260/465.3

[56] References Cited
UNITED STATES PATENTS

| | | |
|---|---|---|
| 3,153,085 | 10/1964 | Hadley ............................. 260/465.3 |
| 3,164,626 | 1/1965 | Minekawa et al. ............... 260/465.3 |
| 3,226,421 | 12/1965 | Giordano et al. ................. 260/465.3 |
| 3,347,899 | 10/1967 | Caporali et al. .................. 260/465.3 |
| 3,424,782 | 1/1969 | Ohmori et al. .................... 260/465.3 |
| 3,471,545 | 10/1969 | Giordano et al. ................. 260/465.3 |
| 3,642,930 | 2/1972 | Grasselli et al. ............. 260/465.3 X |
| 3,741,910 | 6/1973 | Shiraishi et al. ............. 260/465.3 X |
| 3,746,656 | 7/1973 | Shiraishi et al. ............. 260/465.3 X |

*Primary Examiner*—Joseph P. Brust

[57] ABSTRACT

Alpha, beta unsaturated nitriles are prepared from olefins by reaction thereof with ammonia and oxygen, in the gas phase, and in the presence of a novel catalyst system consisting of the elements cerium, tellurium, molybdenum, of one or both the elements selected from the group comprising nickel and cobalt, and moreover of oxygen chemically combined with the above cited elements.

4 Claims, No Drawings

3,928,409

CATALYTIC PROCESS FOR PREPARING UNSATURATED NITRILES FROM OLEFINS, AMMONIA AND OXYGEN

THE PRIOR ART

It is known to prepare alpha, beta unsaturated nitriles from olefins, ammonia and oxygen and in particular to prepare acrylonitrile from propene, ammonia and oxygen, using catalysts of different kinds.

For instance, British Pat. No. 1,016,031 discloses a catalyst consisting of molybdenum, tellurium, cerium and oxygen and having the structure of a heteropolycompound, for use in preparing alpha, beta-unsaturated nitriles from olefins, ammonia and oxygen. U.S. Pat. No. 3,262,962 discloses a catalyst of the formula $Mo_{12} Ce_1$ and in addition Bi. However the catalysts of the prior art have the drawbacks that the conversion of ammonia is not high and furthermore they need a remarkable excess of oxygen in the reaction mixture.

THE PRESENT INVENTION

One object of this invention is to provide an improved process for the catalytic ammoxidation of olefins to high yields of alpha, beta-unsaturated nitriles.

Another object is to provide new catalysts which afford high activity in the preparation of unsaturated nitriles and moreover other considerable advantages that essentially contribute to an efficient and economic operation of the process according to the present invention.

It is possible, therefore, to employ low air/olefins ratios and to obtain high volume-time yields (high hourly weight-volume velocities). The catalyst exhibits an extraordinarily efficient utilization of the ammonia, wherefore the unconverted $NH_3$ amounts present in the effluents from the reactor are substantially reduced and the amounts of sulphuric acid necessary to neutralize said ammonia are minimized too. This brings about an improvement in the operation of the recovery section and to an improvement with regard to fouling, resulting from a reduction in the formation of by-products capable of polymerizing. A further important advantage achieved with the catalyst according to this invention consists in the low costs of the catalyst essential components and in the easiness of preparation.

Another advantage is the exceptional stability in the long run of the catalysts containing nickel and/or cobalt, cerium, tellurium and molybdenum.

The oxidation catalysts, already known from the literature, are very often characterized, during their employment under reaction conditions, by a worsening of the morphological characteristics and of the values concerning catalytic activity and selectivity to nitriles.

The present invention provides a system very stable under the reaction conditions, as shown by the activity and selectivity values, which are particularly high not only after the first reaction hours, but remain such for an unlimited period of time. The reagents employed for producing unsaturated nitriles according to the present invention comprise: oxygen, ammonia and propylene or isobutene.

The olefin may be in admixture with paraffinic hydrocarbons such as, for example, propane, butane and pentane and, for instance, the starting substance may be a propylene and propane mixture. Consequently it is possible to utilize a usual refining product without any special separation of the olefin. According to a preferred embodiment, the process of this invention is characterized in that a mixture consisting of propylene, ammonia and oxygen is contacted with the catalyst at high temperature and at atmospheric pressure, or at a pressure near the atmospheric one.

The process according to this invention may employ any suitable source of oxygen. However, for economic reasons, it is preferable to use air as oxygen source. From a strictly technical view point, pure molecular oxygen yields equivalent results.

The oxygen/olefin molar ratio in the starting material introduced into the reactor ranges from 1.5:1 to 3.5:1, a ratio of about 2:1 to 2.8:1 being preferred.

The ammonia/olefin fed molar ratio may vary from about 0.8:1 to 2:1. There is no real upper limit for the ammonia/olefin ratio, but generally there is no reason for exceeding a ratio of 1.5:1. With ammonia/olefin ratios substantially lower than the stoichiometric ratio 1:1, only negligible amounts of the olefin oxygenated derivatives form, while the selectivity to acrylonitrile remains remarkably high.

Surprisingly, within the range indicated for the ammonia/olefin ratio it is possible to attain a maximum utilization of ammonia, which is highly desirable.

It has been found that the reaction selectivity and the nitrile yield are so high, that it is of no advantage to add steam to the mixture fed to the reactor.

The reaction is conducted at a temperature comprised between about 350° and about 550°C, the preferred temperature being comprised between about 400° and about 500°C.

The total pressure at which the reaction is conducted is not particularly important and therefore it may vary within wide limits, but it depends in part on economic reasons: therefore it is generally operated at pressure close to atmospheric and, more precisely, at pressure slightly higher, i.e. comprised between 1 to 5 absolute atmospheres.

The contact time, expressed in seconds as the ratio between catalytic bed volume and the volumes per second of fed gaseous mixtures of the reagents, measured under the average conditions of temperature and pressure existing in the catalytic bed, may vary depending on the temperatre and as a function of the catalyst nature, of the nature of the catalytic bed, fixed or fluidized, and of the catalyst size; generally it may range from 0.1 to 20 seconds; a preferred range is that of 1–15 seconds because corresponding to the most usual practical employment conditions. For practising the process according to this invention it is possible to use, in general, any apparatus suitable for carrying out oxidation reactions in the vapour phase.

The process according to this invention may be conducted either continuously or discontinuously, but, for practising it on a large technical scale, the continuous method is preferred. The process forming the object of this invention may be practised by using the catalyst in the form of fixed or fluidized bed; in the latter case which, as is known, offers some advantages as regards the thermal control of the reaction, the support nature and the preparation method for obtaining a microspheroidal catalyst having a suitable granulometric distribution become particularly important.

The reagents may be fed onto the catalyst already preheated at a temperature almost equal to the reaction temperature or at room temperature, in such case they rapidly heat in contact with the catalytic bed, no matter whether fixed or fluidized. The reagents may be fed onto the catalyst already thoroughly premixed or partly premixed or thorougly separated; the feeding of the separated or partially premixed reagents can be generally carried out more easily in a fluidized bed reactor.

It is also known and possible to feed the whole air amount and part of the olefin and/or of the ammonia to the reactor bottom and then to feed the remaining amounts of olefin and/or ammonia to one or more upper points inside the catalytic bed.

When the process according to the present invention is practiced with a catalytic fluidized bed reactor, it may be particularly convenient to operate according to British Pat. No. 1,181,292. When conducting the reaction according to the catalytic fixed bed technique, said bed can be realized, according to the art, by arranging the catalyst inside the tubes of a tube bundle reactor and by removing the reaction heat by circulating suitable fluids outside the tubes and, for instance, more usually by means of mixtures of molten salts. It is possible also to operate in a reactor consisting of more adiabatic reaction stages alternated with cooling zones of the reacting mixture.

The catalyst may be also periodically regenerated or reactivated, and this can be achieved, for instance, by bringing the catalyst at high temperature in contact with the air.

The reaction products can be recovered according to any of the known methods. One of such methods consists of the following operations: the gases flowing out from the reactor are scrubbed with cold water or with a suited solvent to remove the reaction products. According to a preferred case, it is possible to use acidified water to absorb the reaction products and to neutralize the small amount of unreacted ammonia. The final step for obtaining the product can be conducted in the usual ways.

The catalyst employable in the process according to this invention is a mixture, a composition or possibly a complex of the oxides of Ce, Te, Mo, Ni and/or Co.

Abovesaid elements are present in the catalytic composition in such amounts, that the atomic ratios to one another correspond to the following formula:

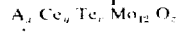

wherein:
A may be Ni and/or Co
x is a number comprised between 0.3 and 5.0
y is a number comprised between 1.0 and 10.0
v is a number comprised between 1.0 and 10.0
z is a number taken to satisfy the average valences of the elements in the oxidation stages in which they exist in the catalyst.

The catalytic composition may be used without carrier and, as such, it exhibits an excellent catalytc activity. For practical uses it is preferably employed in combination with a carrier, as carrier being utilizable any material suited to the purpose such as, for instance, silica, alumina, silicium carbide, silica-alumina, phosphates, silicates, borates, carbonates, provided they are stable under the reaction conditions they will be subjected to during the use of the catalyst. The preferred carrier is silica. The amount of active catalytic composition in relation to the carrier's weight may vary over wide range, according to the characteristics of the carrier and to the preparation method, but in any case it is profitable to operate with an active catalytic composition amount lower than 50% by weight; this permits to obtain little expensive catalysts having an excellent catalytic activity.

The employment of the catalysts described hereinbefore permits to attain high acrylonitrile yields and a very high propylene and ammonia conversion, up to 100%.

Furthermore, it is particularly surprising that these exceptional activities remain unchanged in the longrun; the same may be said also for the morphological and redox characteristics of the catalysts, as proved by the surface area values and by any other data determined to the purpose.

These results are to be ascribed to the fact that the catalysts according to the present invention promote a regular oxidation process easily controllable as regards reaction temperature and contact times.

For preparing the catalyst it is possible to use all the proper methods already known to those skilled in the art. Suitable methods of preparing a supported catalyst to be employed in the form of microspheroidal particles in a catalytic fluidized bed reactor are, in particular, those described in British Pat. Nos. 1,174,786 and 1,167,530.

Various starting compounds may be used for preparing the catalytic composition according to this invention.

Thus, for instance, the starting molybdenum compounds may be selected — depending upon the catalyst preparation method — from amongst : ammonium molybdates, molybdic acid, molybdic anhydride, ammonium salt of the molybdic-ceric acid and nickel or cobalt molybdate.

For nickel and cobalt it is possible to use the nitrate, the oxide, their organic salts and, optionally, also the metals and the molybdates.

As cerium compounds it is possible to use the nitrate, molybdenumceric acid or its ammonium salt.

Tellurium may be introduced into the catalyst in the form of oxide, or telluric acid, or also in the form of metal in powder. The catalyst can be prepared according to the known methods of the art, for example those described in British Pat. Nos. 1,016,031 and 1,167,530.

All the preparation methods entail a final activation step of the catalytic composition, consisting in a heating treatment in the presence of air at a temperature ranging from 450° to 700°C, preferably from 500° to 650°C, in any case higher than the temperature employed.

Some proper methods of preparing the catalyst are indicated hereinafter:

1. An aqueous solution of the ammonium salt of the cerium-molybdic acid is mixed with a nitric solution of $TeO_2$, of nickel nitrate and/or cobalt nitrate and, optionally, of cerium nitrate and an aerogel of the commercial type. After evaporation, the catalyst is extruded, dried and activated at a temperature comprised between 400° and 600°C.

2. A nitric solution of telluric acid and nitrates of Ce and nickel and/or cobalt is added with a silicaa sol and then with an aqueous solution of ammonium paramolybdate. The mixture resulting therefrom is spray-dried and the catalyst thus obtained in the form of particles is activated by heating a temperature between 400° and 600°C.

3. An aqueous solution of ammonium paramolybdate is admixed to a nitric solution of telluric acid and nitrates of cerium and nickel and/or cobalt.

The solution resulting therefrom, having a volume equal to that of the carrier's pores, is used to impregnate a silica of the commercial type, optionally of microspheroidal size. The product obtained is dried for 12 hours at 110°–120°C and then activated at a temperature ranging from 400° to 600°C. Besides being used for impregnating the silica, the resulting solution can be evaporated to dryness, the residue can be ground and activated, thus obtaining a non-supported catalyst.

4. An aqueous solution of ammonium paramolybdate is added, under intense stirring, with metal tellurium in powder and then gradually with $H_2O_2$ under hot conditions. Subsequently, a further amount of $H_2O_2$ is admixed under cold conditions, then $HNO_3$ and the nitrates of cerium and of nickel and/or cobalt. The solution thus obtained, once suitably diluted with water, is used to impregnate a silica of the commercial type according to the modalities described hereinabove. The product is dried and activated.

5. Ammonium paramolybdate is dissolved in an aqueous solution of $H_2O_2$, thus obtaining an ammonium permolybdate aqueous solution.

Separately, another solution acidified by $HNO_3$ is prepared by dissolving telluric acid $H_2TeO_4 \cdot 2H_2O$, nickel and/or cobalt nitrate and cerium nitrate. The permolybdate solution is then gradually poured into the one containing tellurium, cerium, nickel and/or cobalt.

The solution obtained, once suitably diluted, is used to impregnate a silica of the commercial type. The product is then dried and activated.

The following examples are given to better illustrate some practical embodiments of the present invention, without being however a limitation thereof.

EXAMPLE 1

The catalyst was prepared according to method 5) described hereinbefore and resulted to be composed for 76.1% by a $SiO_2$ carrier and for 23.9% by an activated part in which the atomic ratios of the elements to one another are represented by the empirical formula $Ni_2 Ce_3 Te_4 Mo_{12}$ The surface are determined on a catalyst sample resulted to be of 201 m²/g.

The ammoxidation reaction was conducted in a reactor charged with aforesaid catalyst, in the form of fixed bed.

The feeding mixture was made up of propylene, $NH_3$, air in the following molar ratios: 1/1.2/12. The reaction temperature was 440°C and the contact time 2.5 seconds.

On the basis of the reaction gases analysis, an acrylonitrile yield of 82.4% was calculated, by yield meaning the following ratio:

$$\frac{\text{grams of carbon of the acrylonitrile obtained}}{\text{grams of carbon of the propylene fed}} \times 100$$

EXAMPLE 2

The catalyst was prepared according to method (4) reported in the description hereinbefore, and it resulted to be composed for about 75% by a $SiO_2$ carrier and for the remaining portion by the activated part, in which the atomic ratios of the elements to one another are indicated by the empirical formula $Ni_1 Ce_4 Te_4 Mo_{12}$ The ammoxidation reaction was conducted in a reactor charged with the abovesaid catalyst in the form of fixed bed.

The feeding mixture was made up of propylene, ammonia, air in the following molar ratios: 1/1.3/12.

The reaction temperature was of 440°C and the contact time of 1.5 seconds.

On the basis of the reaction gases analysis, a selectivity in acrylonitrile of 85.7% and a yield equal to 83.0% were calculated. Whenever used herein, the term "selectivity" means the ratio:

$$\frac{\text{obtained grams of carbon of the product considered}}{\text{grams of carbon of the reacted propylene}} \times 100$$

By titration it was possible to calculate a conversion of the fed ammonia equal to 98.9%, by conversion meaning the ratio between reacted ammonia amount and fed ammonia amount.

EXAMPLE 3

The catalyst was prepared according to method (5) described hereinbefore and resulted to be composed for about 77% by a $SiO_2$ carrier and for the remaining portion by the activated part in which the atomic ratios of the elements to one another are indicated by the empirical formula $Ni_3 Ce_2 Te_4 Mo_{12}$ The surface area determined on a catalyst sample resulted to be of 207 m²/g.

The ammoxidation reaction was conducted in a reactor charged with aforesaid catalyst in the form of fixed bed.

The feeding mixture was made up of propylene, ammonia, air in the following molar ratios: 1/1.1/11.

The reaction temperature was of 440°C and the contact time 2.5 seconds.

On the basis of the reaction gases analysis, an acrylonitrile yield of 79.8% and an ammonia conversion of 100% were calculated.

EXAMPLE 4

The catalyst was prepared according to method (5) described hereinabove and resulted to be made up to about 75% of a $SiO_2$ carrier and for the remaining portion of the activated part in which the atomic ratios of the elements to one another are indicated by the empirical formula $Co_1 Ce_4 Te_4 Mo_{12}$ The ammoxidation reaction was conducted in a reactor charged with the abovesaid catalyst, in the form of fixed bed.

The feeding mixture was made up of propylene, ammonia, air in the following molar ratios: 1/1.2/12.

The reaction temperature was of 420°C and the contact time 3.5 seconds.

On the basis of the reaction gases analysis an acrylonitrile yield of 81.4% and a fed ammonia conversion of 99.6% were determined.

EXAMPLE 5

The catalyst was prepared according to method (4) described hereinbefore and resulted to be composed for about 75% by a $SiO_2$ carrier and for the remaining portion by the activated part in which the atomic ratios of the elements to one another are indicated by the empirical formula

The ammoxidation reaction was conducted in a reactor charged with abovesaid catalyst, in the form of fixed bed.

The feeding mixture was made up of propylene, ammonia, air in the following molar ratios: 1/1.3/11.

The reaction temperature was of 440°C and the contact time 2.5 seconds.

On the basis of the reaction gases chromatographic analysis, a selectivity in acrylonitrile of 87.5% corresponding to a yield of 82.5% was determined.

The catalyst surface area at the conclusion of the test was of 184 m²/g.

EXAMPLE 6

The catalyst was prepared according to method (2) described hereinbefore and resulted to be composed for about 77% by a $SiO_2$ carrier and for the remaining portion by the activated part in which the atomic ratios of the elements to one another are indicated by the empirical formula

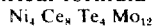

The ammoxidation reaction was conducted in a reactor charged with abovesaid catalyst, in the form of fixed bed.

The feeding mixture was made up of propylene, ammonia, air in the following molar ratios: 1/1.5/12.

The reaction temperature was of 460°C and the contact time 2 seconds.

On the basis of the reaction gases analysis, an acrylonitrile yield of 78.3% and an ammonia conversion of 100% were calculated.

EXAMPLE 7

The catalyst was prepared according to method (4) described hereinbefore and resulted to be composed for about 24% by a $SiO_2$ carrier and for the remaining portion by the activated part in which the atomic ratios of the elements to one another are indicated by the empirical formula $Ni_2\ Ce_3\ Te_6\ Mo_{12}$ The surface area determined on a catalyst sample resulted to be of 216 m²/g.

The ammoxidation reaction was conducted in a reactor charged with the aforesaid catalyst in the form of fixed bed.

The feeding mixture was made up of propylene, ammonia, air in the following molar ratios: 1/1.3/11.

The reaction temperature was of 430°C and the contact time 4 seconds.

On the basis of the reaction gases analysis, an acrylonitrile yield of 80.1% and a selectivity of 86.3% were determined.

EXAMPLE 8

The catalyst was prepared according to method (3) described hereinbefore and resulted to be composed for about 75% by a $SiO_2$ carrier and for the remaining portion by the activated part in which the atomic ratios of the elements to one another are indicated by the empirical formula $Ni_4\ Ce_1\ Te_1\ Mo_{12}$ The surface area determined on a catalyst sample resulted to be of 337 m²/g.

The ammoxidation reaction was conducted in a reactor charged with abovesaid catalyst, in the form of fixed bed.

The feeding mixture was made up of propylene, ammonia, air in the following molar ratios: 1/1.5/12.

The reaction temperature was of 440°C and the contact time 2.5 seconds.

On the basis of the reaction gases analysis an acrylonitrile yield of 74.5% was determined.

EXAMPLE 9

The catalyst was prepared according to method (1) described hereinbefore and resulted to be composed for about 65% by a $SiO_2$ carrier and for the remaining portion by the activated part in which the atomic ratios of the elements to one another are indicated by the empirical formula

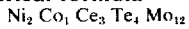

The ammoxidation reaction was conducted in a reactor charged with abovesaid catalyst in the form of fixed bed.

The feeding mixture was made up of propylene, ammonia, air in the following molar ratios: 1/1.5/12.

The reaction temperature was of 450°C and the contact time 3.5 seconds.

On the basis of the reaction gases analysis on acrylonitrile yield of 77.4% was calculated.

The ammonia conversion, determined by titration, resulted of 99.6% and the catalyst surface area at the conclusion of the test was of 297 m²/g.

EXAMPLE 10

The catalyst was prepared according to method (2) described hereinbefore and resulted to be composed for about 50% by a $SiO_2$ carrier and for the remaining portion by the activated part in which the atomic ratios of the elements to one another are indicated by the empirical formula $Ni_2\ Ce_3\ Te_4\ Mo_{12}$ The ammoxidation reaction was conducted in a reactor charged with abovesaid catalyst, in the form of fixed bed.

The feeding mixture was made up of propylene, ammonia, air in the following ratios: 1/1/10.

The reaction temperature was of 460°C and the ontact time 2.5 seconds.

On the basis of the reaction gases analysis, an acrylonitrile yield of 80.6% and an ammonia conversion of 99.8% were determined.

EXAMPLE 11

The catalyst was prepared according to method (4) described hereinbefore and resulted to be composed for about 75% by a $SiO_2$ carrier and for the remaining portion by the activated part in which the atomic ratios of the elements to one another are indicated by the empirical formula $Ni_2\ Ce_3\ Te_4\ Mo_{12}$ The ammoxidation reaction was conducted in a reactor charged with abovesaid catalyst in the form of fluidized bed.

The pressure in the reactor was 1.8 kg/cm² abs. The feeding mixture was made up of propylene, ammonia, air in the following molar ratios: 1/1/12.

The reaction temperature was 440°C and the contact time 12 seconds. The test was conducted for more than 1,000 hours without any interruption, and very constant results were obtained.

The analyses of the effluent gases and of the catalyst carried out during the test supplied the following data.

| | Conversions | | | Selectivity | | | | |
|---|---|---|---|---|---|---|---|---|
| Operation hours | Propylene | Ammonia | Acrylonitrile | HCN | Acetonitrile | $CO + CO_2$ | Acrylonitrile yield % | Surface $m^2/g$ |
| 18 | 98.1 | 99.5 | 77.8 | 3.2 | 1.8 | 17.2 | 76.3 | 249 |
| 234 | 96.4 | 99.1 | 79.7 | 3.1 | 2.1 | 15.1 | 76.9 | 231 |
| 559 | 95.9 | 98.7 | 80.4 | 2.9 | 2.4 | 14.3 | 77.1 | 238 |
| 941 | 96.2 | 99.2 | 79.2 | 3.4 | 2.0 | 15.4 | 76.2 | 226 |

We claim:

1. The process for the preparation of acrylonitrile or methacrylonitrile from propene or respectively isobutene, by reaction in the gas phase, with ammonia and oxygen in the presence of a solid catalyst, at a temperature between 350°C and 550°C, said process being characterized in that the catalyst system consists of the elements tellurium, cerium, molybdenum, of one or both the elements selected from the group consisting of nickel and cobalt, chemically combined with oxygen, and the various elements are present in the atomic ratios defined by the following empirical formula:

$$A_x Ce_y Te_v Mo_{12} O_z$$

wherein:
A is Ni and/or Co
$x = 0.3–5$
$y = 1–10$
$v = 1–10$ and
$z$ is a number indicating the amount of oxygen bound to the other elements and corresponding to the oxidation state in which they exist in the catalyst, said catalyst being obtained by mixing compounds of Mo, Ce, Te and of at least one element selected from the group consisting of Ni and Co in an aqueous medium, and then drying the mixture and heating it in the presence of air at a temperature ranging from 450°C to 700°C.

2. The process of claim 1 wherein the catalyst is employed with a catalyst support.

3. The process of claim 2 wherein silica is used as the support.

4. The process of claim 1 wherein the catalyst is employed in the form of a fixed or fluidized catalyst bed.

* * * * *

UNITED STATES PATENT OFFICE
CERTIFICATE OF CORRECTION

Patent No. 3,928,409            Dated December 23, 1975

Inventor(s) Francesco PIGNATARO et al      Page 1 of 2

It is certified that error appears in the above-identified patent and that said Letters Patent are hereby corrected as shown below:

Col. 1 - <u>Line 4 from below,</u>    - - - ethane - - - should appear before "propane,".

Col. 2 - Line 45,                     "temperatre" should be - - - temperature - - -.

Col. 3 - Lines 2 and 3,               "thorougly" should be - - - thoroughly - - -.

Col. 4 - Line 60                      "silicaa" should be - - - silica - - -.

Col. 5 - Line 43,                     after "surface" the printed word "are" should be - - - area - - -.

Col. 6 - <u>Line 45, Example 4,</u>   the word "to" before "about" should be - - - for - - -.

Col. 8 - Line 23, Example 9,          the word "on" before "acrylonitrile" should be - - - an - - -.

UNITED STATES PATENT OFFICE
CERTIFICATE OF CORRECTION

Patent No. 3,928,409　　　　　　　　Dated December 23, 1975

Inventor(s) Francesco PIGNATARO et al　　Page 2 of 2

It is certified that error appears in the above-identified patent and that said Letters Patent are hereby corrected as shown below:

Col. 8 - Line 40,　　　　　the word - - - molar - - - should appear before "ratios".

Cols. 9 and 10 - last right-hand column, the heading should be - - -

Surface area $m^2/g$ - - -, not

"Surface $m^2/g$".

Signed and Sealed this nineteenth Day of July 1977

[SEAL]

Attest:

RUTH C. MASON　　　　　　　　　　C. MARSHALL DANN
Attesting Officer　　　　　　　　Commissioner of Patents and Trademarks